(12) United States Patent
Zeyfert et al.

(10) Patent No.: US 10,994,508 B2
(45) Date of Patent: May 4, 2021

(54) FILM

(71) Applicants: INNOVIA FILMS LIMITED, Wigton (GB); FOOD FRESHNESS TECHNOLOGY HOLDINGS LIMITED, Cranfield (GB)

(72) Inventors: Caroline Zeyfert, Wigton (GB); Jonathan Hewitt, Wigton (GB); Jamie Moffat, Wigton (GB); Elizabeth Tatlock, Wigton (GB); Adam Edkins, Atherstone (GB); Lawrence James Davison Matthews, Newmarket (GB)

(73) Assignees: INNOVIA FILMS LIMITED, Wigton (GB); FOOD FRESHNESS TECHNOLOGY HOLDINGS LIMITED, Cranfield (GB)

( * ) Notice: Subject to any disclaimer, the term of this patent is extended or adjusted under 35 U.S.C. 154(b) by 0 days.

(21) Appl. No.: 15/565,806

(22) PCT Filed: May 11, 2016

(86) PCT No.: PCT/GB2016/051340
§ 371 (c)(1),
(2) Date: Oct. 11, 2017

(87) PCT Pub. No.: WO2016/181132
PCT Pub. Date: Nov. 17, 2016

(65) Prior Publication Data
US 2018/0105663 A1    Apr. 19, 2018

(30) Foreign Application Priority Data
May 12, 2015    (GB) ..................................... 1508068

(51) Int. Cl.
*B32B 1/02*    (2006.01)
*B32B 3/08*    (2006.01)
(Continued)

(52) U.S. Cl.
CPC ................. *B32B 3/08* (2013.01); *B32B 1/02* (2013.01); *B32B 3/10* (2013.01); *B32B 27/18* (2013.01);
(Continued)

(58) Field of Classification Search
CPC .... B32B 1/02; B32B 3/08; B32B 3/10; B32B 27/30; B32B 27/308; B65D 31/00;
(Continued)

(56) References Cited

U.S. PATENT DOCUMENTS 4,847,145 A    7/1989    Matsui
5,129,735 A *  7/1992    Neal ..................... B65D 31/02
                                                  220/495.08

(Continued)

FOREIGN PATENT DOCUMENTS

CN    201127256    10/2008
CN    102527258    7/2012
(Continued)

OTHER PUBLICATIONS

International Search Report and Written Opinion of the International Searching Authority of application No. PCT/GB2016/051340 dated Jul. 28, 2016.

(Continued)

*Primary Examiner* — Walter Aughenbaugh
(74) *Attorney, Agent, or Firm* — Ping Wang; Morris, Manning & Martin LLP

(57) ABSTRACT

A film for use in a packaging structure, comprising a coating on the film surface which comprises a binder and a particulate protuberant component able to remove a volatile organic compound from an environment in contact with the film in the packaging structure. Also provided is a packaging structure comprising such a film and a package which comprises the packaging structure.

21 Claims, 5 Drawing Sheets

(51) Int. Cl.
  B65D 65/40   (2006.01)
  B32B 27/18   (2006.01)
  B32B 27/32   (2006.01)
  B65D 81/26   (2006.01)
  C08J 7/04    (2020.01)
  C08J 5/18    (2006.01)
  B32B 3/10    (2006.01)
  B32B 27/30   (2006.01)
  C09D 7/62    (2018.01)
  B65D 65/42   (2006.01)
  C09D 5/00    (2006.01)
  C09D 123/08  (2006.01)
  C09D 133/02  (2006.01)
  C09D 157/06  (2006.01)
  C08K 3/08    (2006.01)
  C08K 9/02    (2006.01)

(52) U.S. Cl.
  CPC .......... *B32B 27/30* (2013.01); *B32B 27/308* (2013.01); *B32B 27/32* (2013.01); *B65D 65/40* (2013.01); *B65D 65/406* (2013.01); *B65D 65/42* (2013.01); *B65D 81/267* (2013.01); *C08J 5/18* (2013.01); *C08J 7/042* (2013.01); *C08J 7/0427* (2020.01); *C09D 5/00* (2013.01); *C09D 7/62* (2018.01); *C09D 123/0869* (2013.01); *C09D 133/02* (2013.01); *C09D 157/06* (2013.01); *B32B 2439/70* (2013.01); *C08J 2300/22* (2013.01); *C08J 2323/02* (2013.01); *C08J 2323/10* (2013.01); *C08J 2323/12* (2013.01); *C08J 2423/08* (2013.01); *C08J 2433/02* (2013.01); *C08J 2433/06* (2013.01); *C08J 2457/06* (2013.01); *C08J 2475/04* (2013.01); *C08J 2491/06* (2013.01); *C08K 3/08* (2013.01); *C08K 9/02* (2013.01); *C08K 2201/008* (2013.01)

(58) Field of Classification Search
  CPC ...... B65D 31/005; B65D 31/02; B65D 31/08; B65D 31/10; B65D 31/16; B65D 31/18; B65D 27/00; B65D 27/005; B65D 65/40; B65D 65/406; B65D 65/42; B65D 81/267
  See application file for complete search history.

(56) References Cited

U.S. PATENT DOCUMENTS

| | | | |
|---|---|---|---|
| 5,556,699 A | 9/1996 | Niira et al. | |
| 5,807,630 A | 9/1998 | Christie et al. | |
| 2002/0090425 A1 | 7/2002 | Clarke | |
| 2005/0147772 A1 | 7/2005 | Beaudouin et al. | |
| 2012/0124762 A1* | 5/2012 | Caligaris | A47L 13/17 15/104.002 |
| 2016/0115340 A1 | 7/2016 | Hashimoto et al. | |

FOREIGN PATENT DOCUMENTS

| | | |
|---|---|---|
| EP | 0 180 360 | 5/1986 |
| EP | 0 781 649 | 7/1997 |
| EP | 1 081 181 | 3/2001 |
| EP | 1 525 802 | 4/2005 |
| EP | 2 060 392 | 5/2009 |
| GB | 2252968 | 8/1992 |
| JP | S63309137 | 12/1988 |
| JP | H02119938 | 5/1990 |
| JP | H02222725 | 9/1990 |
| KR | 95-13687 | 11/1995 |
| KR | 20090074754 | 7/2009 |
| WO | 0245847 | 6/2002 |
| WO | 2007052074 | 5/2007 |
| WO | 2008110020 | 9/2008 |
| WO | 2011001186 | 1/2011 |
| WO | 2012089805 | 7/2012 |
| WO | 2014/192570 | 4/2014 |

OTHER PUBLICATIONS

Combined Search and Examination Report Under Sections 17 and 18(3) of Application No. GB1508068.2 dated Nov. 9, 2015.
Vermeiren, L. et al., "Developments in the active packaging of foods", Trends in Food Science & Technology, vol. 10(3), 1999, pp. 77-86. (Abstract only).
Suslow, T. et al., "Performance of zeolite based products in ethylene removal", Perishables Handling Quarterly Issue No. 92, 1997, pp. 32-33.

* cited by examiner

Sample 001  0.1g/m² E+

Sample 002  0.2g/m² E+

Scanning electron microscopy

Image four: Sample 001  0.1g/m² E+

FILM

This application is a national stage application of International Patent Application No. PCT/GB2016/051340, filed on May 11, 2016, which claims priority from Great Britain Patent Application No. 1508068.2, filed on May 12, 2015. The entirety of the aforementioned applications is incorporated herein by reference.

FIELD

The present invention relates to a film for use in a packaging structure, specifically a film that comprises a component able to remove volatile organic compounds.

BACKGROUND

Modification of the environment within packaging can be very important and can be achieved in a number of ways. Such modification is particularly important when the packaging contains organic matter, such as food products. Organic matter can emit volatile organic compounds (VOCs) such as ethylene or trimethylamine, which can have an effect on the quality of the organic matter itself.

The removal of VOCs from the packaging environment helps to prolong the shelf life and enhance the marketable quality of the organic matter, such as fresh produce and horticultural products, as well as the quality of the matter over time. It can also help to reduce or eliminate unwanted odours and to maintain the colour and/or the firmness of the organic matter.

Ethylene acts as a ripening hormone, which can lead to over-ripening of the organic matter in the packaging and thereby reduce its quality, as well as causing yellowing and peel damage. Ethylene is also produced by organic matter as a result of stress and so its removal helps to mitigate the effects of stress on the organic matter. There are currently a number of ways to remove ethylene from a packaging environment, such as ventilation, chemical techniques, adsorption, photocatalytic methods, chemically catalytic methods and scavenging.

One approach is to inhibit the action of ethylene in the organic matter itself, which can in turn reduce the amount of ethylene released by the produce into the packaging. Such ethylene blocking techniques include 1-Methylcyclopropene (1-MCP), which blocks ethylene binding sites and is applied exogenously as a gas, as well as silver thiosulfate (STS), which is largely restricted in use to cut flowers and is applied by putting the cut flower stems in a solution containing the STS.

Aminoethoxyvinylglycine (AVG) is another ethylene blocking agent, which acts as a plant growth regulator by blocking the production of ethylene in the plant tissue. It is generally sprayed onto the organic matter, usually 1 to 3 weeks prior to harvesting. However, this approach can result in more permanent effects in preventing ripening.

Alternatively, ethylene or other VOCs can be removed from the environment once they have been released. Catalytic systems, often based on platinum and/or alumina are well known in the art to oxidise ethylene to carbon dioxide and water. However, these generally work at elevated temperatures (often above 200° C.) and so are not particularly useful with matter that can be damaged at such temperatures. There are also reports of the use of photocatalytic oxidation of ethylene using titanium dioxide, which can occur at room temperature.

Also known in the art are stoichiometric oxidising agents, which are mostly based on potassium permanganate ($KMnO_4$), which again oxidise ethylene and are themselves reduced. However, this process can also lead to the production of partially oxidised species, such as carboxylic acids, acetaldehyde and formaldehyde. Such systems also do not work well under high humidity and so are generally kept out of contact with water in some way.

Sorbents are also known in the art to remove VOCs, particularly ethylene, from the environment. These compounds work by sorption of the VOCs and are often based on high surface area materials. Sorbents commonly used to remove ethylene include activated carbon, clays and zeolites.

Zeolites are particularly well known as sorbents for removing ethylene from the environment and suitable zeolite compositions are disclosed in GB2252968, WO2007/052074 and WO2011/001186. However, they are also poisoned by water and so means for preventing or at least hindering the zeolite from coming into contact with water is required when these compounds are used commercially.

Zeolites are commonly used in prior art packaging in the form of a separate structure that is inserted inside the packaging during manufacture. The structure comprises a substrate, such as a film (biaxially orientated polypropylene is commonly used) which forms a filter generally about 1.75 square inch (about 20 $cm^2$) in area. A membrane (such as a porous membrane, like Tyvek™) is then applied so that water cannot come into direct contact with the zeolite. The zeolite is coated on the membrane and the substrate is subsequently applied. The finished filter is then placed next to or in proximity with the organic matter, inside the packaging. Additionally, sheets of a similar structure can be used as transit liners or bags, or the structure can be incorporated into a bubble wrap layer or a moisture absorbent pad, or laminated to further structures.

Incorporation of the components discussed above directly into films or coating layers is also known in the art, as disclosed in EP1525802, WO2008/110020, JPH02119938 and JPH02222725. However, the components are used in small amounts and are embedded within a layer of binder material that is permeable to the relevant VOC. This ensures that the component is protected from moisture and other factors that may reduce its efficiency, while still being able to remove the VOC from the environment.

U.S. Pat. No. 5,807,630 discloses a controlled permeability film including a film forming polymer and optionally also a dispersing polymer and an inert porous filler, which may have a surface modifying agent coated thereon. The inert porous filler is present in an amount effective to reduce the ratio of the carbon dioxide permeability to the oxygen permeability of the film and the filler has a particle size greater than the intrinsic film thickness of the film forming polymer.

US2005/0147772 discloses a packaging material comprising two layers delimiting between them a cavity. A substance capable of retaining gas therein is housed in the cavity and one of the layers is permeable to gaseous ethylene and impermeable to water vapour.

US2002/0090425 discloses containers including a gas-permeable membrane comprising (1) a microporous film and (2) a polymeric coating on the microporous film. The containers enable storage and/or ripening of bananas under controlled conditions.

U.S. Pat. No. 4,847,145 discloses a film for keeping vegetables and fruit fresh, which has an ethylene-adsorptive activity. The film preferably contains a fine-porous material.

EP2060392 discloses an at least two-layer polyester film comprising at least one antimicrobially modified outer layer comprising a silver-loaded zeolite, wherein the layer thickness is not greater than 1.3 times the median particle size of the zeolite.

JPS63309137 discloses a synthetic polymer film layer containing 1 to 30 wt. % crystalline zeolite, which has >=3.2 Angstrom pore diameter and <=20 mum particle diameter and can be used as a sheet, bag or lining for corrugated board boxes.

The present invention has been devised with the foregoing in mind.

BRIEF DESCRIPTION OF DRAWINGS

One or more specific embodiments in accordance with aspects of the present invention will be described, by way of example only, and with reference to the following drawings.

DETAILED DESCRIPTION

Figure 1:
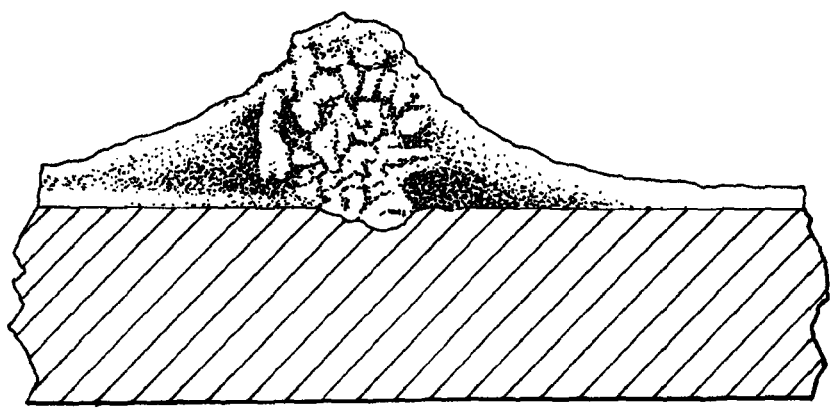
FIG. 1 illustrates a scanning electron microscope image of a sectioned edge of sample 002 of Example 3.

According to a first aspect of the present invention, there is provided a film for use in or as a packaging structure, comprising a coating on the film surface which comprises a binder and a particulate protuberant component able to remove a volatile organic compound from an environment in contact with the film in the packaging structure.

Typically the environment in contact with the film is an atmospheric environment into which at least one volatile organic compound is emitted from organic matter contained within the packaging structure. Both modified and unmodified atmosphere packaging structures are specifically contemplated.

The protuberant component may be able to remove via any effective means such as adsorption, absorption or chemical modification the volatile organic compound from the environment in contact with the film in the packaging structure. For convenience we shall use the term "scavenging" herein to describe all mechanisms by which volatile organic compounds may be removed from the environment in contact with the packaging structure and the terms "scavenger" and "scavenging component" shall be construed accordingly.

The scavenger is incorporated in the film coating, and its protuberance can improve the efficiency of the removal of the volatile organic compound. This protuberance increases the surface area of the scavenger, or the active component of the scavenger, to the environment, thereby increasing its availability to the volatile organic compound. Additionally, it improves the kinetics of the reaction, as the volatile organic compound does not have to pass through significant amounts of film material. However, it may be important for there to be sufficient coating material around the scavenger to anchor it within the coating.

Consequently, the efficacy of the scavenger with respect to the removal of volatile components from the surrounding atmosphere is improved by virtue of its protuberance, increasing the surface area of contact between the scavenging component and the surrounding atmosphere beyond that which would be achieved if the component was not protuberant but rather fully embedded in the coating layer. This arrangement of protuberance can be achieved in a number of ways, such as using a thin coating layer and/or a high concentration of the component in the coating and/or by selecting the size of the protuberant component with reference to the coating thickness (or coat weight) to be greater in at least one dimension than the coat weight. The environment from which the volatile organic compound is removed may be at least partially surrounded or enveloped by the film.

The scavenging component is a particulate material. The particles may protrude out of the coating and therefore may be exposed (i.e. may not have any coating covering at least part of them). Alternatively, a thin layer of coating may cover the particle. "Protuberant" in this sense does not necessarily mean "exposed" since the material of the coating layer may extend over the protuberant component. The protuberant component therefore protrudes from the coating in the sense that the component extends out from the surface of the film beyond the basic thickness of the coating layer (i.e. what would be the thickness of the coating layer in the absence of the protuberant component). The presence of a small amount of coating material over the protuberant component does not remove the activity of the protuberant component because volatile components in the surrounding atmosphere are able to pass through the coating material to contact the protuberant component. However the extent to which such volatile components are able to contact the component through the coating is enhanced by the protuberance of the component beyond that which would be achievable if the same component were not protuberant but embedded completely in the coating. Hence the protuberance of the scavenging component represents a significant advantage over prior art compositions.

The coating may be thinner than the average diameter of the particles of the component. This can ensure that some of the component will protrude from coating. It can also provide improved optical properties, such as improved transparency. Further, the film may be cheaper to manufacture, as less coating material is required.

The average binder thickness in the coating layer (i.e. the thickness of the binder alone, without the presence of any particles) can be selected with reference to the particle size of the scavenger to ensure protuberance of the scavenger. The average binder thickness in the coating layer is preferably less than the particle size of the protuberant component. For example the average binder thickness in the coating layer may be from about 10% to about 90%, from about 20% to about 80% or from about 25% to about 75% of the particle size of the protuberant component. This is particularly preferable if the amount of scavenger particles in the coating is low, such that there is only one particle in the coating between the film and the surface of the coating. The thickness of the coating as a whole (i.e. the combined thickness of the binder and the particles) may also be less than the particle size of the protuberant component.

The average binder thickness in the coating layer applied to the film may be from 0.1 µm to 10 µm, for example 0.25 µm to 8.5 µm, 0.5 µm to 7.5 µm or 0.7 µm to 6.0 µm.

Additionally or alternatively, the relative amounts of scavenger particles and binder can be selected to ensure protuberance of the scavenger. Specifically, a high amount of particles relative to the amount of binder can be used, such that the particles rest on one another in the direction between the film and the surface of the coating. In other words, an axis perpendicular to the film passes through more than one particle in the coating material between the film and the surface of the coating, due to a stacking of the particles.

In this embodiment, the thickness of the coating as a whole may be greater than the particle size of an individual protuberant component, but less than the combined particle sizes of two, three, four or more protuberant components, depending on the amount of particles used, such that the components are protuberant. Further, the average binder thickness in the coating layer may be less than, greater than or the same as the particle size of the individual protuberant component.

"Particle size" in the paragraph above may mean any one of more of d1-99, for example d10, d50, or d90 or to any other selected particle size in a normal or non-normal distribution of particles. For example the arithmetic mean particle size may be used.

The particle size of the scavenger referenced above may be determined by number or by volume, for example by laser scattering using for example a Beckmann Coulter particle sizer, and determining the average particle size from a volume percentage (see FIG. 6 below).

The coating may comprise a flood coating, for example an aqueous flood coating applied by gravure, reverse gravure or any other coating technique to the film. Other coating techniques such as slot die or extrusion coating are also within the scope of this invention. The use of flood coating provides an even distribution of the coating material over the film, which in turn provides an even distribution of the component able to remove volatile organic compounds. However, pattern coatings may also be used.

The concentration in the coating of the component able to remove volatile organic compounds from the environment may be between 0.001 and 50 $gm^{-2}$, preferably between 0.005 and 30 $gm^{-2}$, more preferably between 0.01 and 14 $gm^{-2}$, for example from 0.1 to 10 $gm^{-2}$ and most preferably between 0.1 and 5 $gm^{-2}$. At this level, sufficient volatile organic compounds, in particular ethylene, can be removed from the environment in contact with the packaging structure. However, this level is sufficiently low to reduce cost and maintain desirable features of the film, such as transparency.

The use of a coating, especially a thin coating, can create a film that is not totally opaque, so that the contents of the packaging structure can still be seen through the film. Further, the coating maintains the stability of the component able to remove volatile organic compounds within the dispersion. It is also easier to handle the component when it is in an aqueous form, rather than using solvents that require an inert atmosphere. This therefore ensures that the component able to remove volatile organic compounds remains functional for longer than may otherwise be expected.

The coating may comprise an olefin, an ester, an ether, a urethane or acrylic polymer, a wax, another water repelling compound including those which are considered as antifoams or dispersing agents or a combination of these. The component able to remove volatile organic compounds may be poisoned by water and so a coating that reduces the amount of water contacting the component may be beneficial.

The film may be a polymeric film. Polymeric films according to the invention can be made by any process known in the art, and the term includes, but is not limited to, cast sheet, cast film, or blown film. The film may comprise a polyolefin film, for example polyethylene, polypropylene, polybutylene, mixtures, blends and copolymers (both block and random) thereof, and/or other known polyolefins.

Alternatively, the film may comprise a polyester film, a polyamide film, a polyurethane film, a polyvinylhalide film, acetate film or a biopolymer film such as a cellulosic film, a PLA film, a starch based film or a PHA film.

The film may further comprise a functional barrier layer as a topcoat. This layer may act to limit migration of the functional part of the component. The layer may also protect the component able to remove volatile organic compounds from dusting of the component or from water, which may be particularly important for those parts of the component that are exposed (i.e. not covered by the coating). This may be particularly important when the component is a zeolite, as these components can be poisoned or otherwise compromised by contact with water.

A topcoat may also be used for regulatory reasons, for example if the film is to be used in contact with foodstuffs. A topcoat may also be used to improve the aesthetics of the film, possibly to make the film more glossy and/or more transparent due to surface topology. A topcoat may also be used to improve the heat sealability, printability or peelability of the film The topcoat barrier layer may comprise a separate layer applied in a coating step. This is a simple and cheap way in which to create a topcoat barrier layer on the surface of the film.

Additionally or alternatively, the topcoat barrier layer may comprise a component that migrates to the surface from the initial coating to form a barrier, which may be a hydrophobic barrier. In this embodiment, the topcoat barrier layer may be formed from components that are present in the initial coating, which then migrate to the surface to form such a barrier.

The volatile organic compound may be ethylene or acetaldehyde. Ethylene is responsible for the ripening of a variety of organic material. Its removal from a packaging structure can therefore increase the shelf life of the organic material. Other materials which may be mentioned amongst organic volatile compounds within the scope of this invention include other plant growth regulators such as: Gibberellins (GA), for example GA4GA7 and GA3; cytokinins, such as CPPU and kinetin; Auxins, such as 1-naphthalenacetic acid (NAA), 2,4-D, 3-indoleacetaldehyde acid (IAld), 3-indoleacetic acid (IAA), 3-indolepyruvic acid (IPA) and indolebutanoic acid (IBA); and Inhibitors/Retardants, such as abscisic acid (ABA), ancymidolm, carbaryl, chlormequat, chloro IPC, daminozide, flurprimidol, hydrogen cyanamide (H2CN2), mefluidide, mepiquat chloride, paclobutrozol, prohexadione calcium, and succinic acid (SADH).

The component able to remove ethylene from the environment in contact with the film in the packaging structure may comprise a sorbent. The sorbent may be a microporous material such as a Zeolite, Sepiolite or Diatomite which may be ZSM5, or a clay. The zeolite or other microporous material may be doped, for example with a metal such as palladium. Palladium doped zeolites are particularly contemplated, as described in WO2011/001186.

Sorbents, specifically zeolite sorbents, are well known in the art for use in the removal of ethylene from an environment. They are readily available and their chemistry is well known.

The scavenger may be functional at any suitable temperature in packaging chain, for example from −30° C. to 50° C.

The coating comprises a binder. Suitable binders may by way of non-limiting example be selected from water dispersible or otherwise soluble (in suitable solvent systems) acrylic and acrylic acid polymers and co-polymers, acrylates, urethanes, urethane acrylates, isocyanates, epoxides, styrene butadiene rubbers, cyclised rubbers, chlorinated rubbers, styrene butadiene/maleic anhydride copolymers, styrene acrylates, ink binders, cellulosic materials, cellulose acetate, cellulose acetate alkyrate (eg butyrate and propionate), polyvinylbutyral, polyvinyl formal, polyvinylacetate, polyvinyl alcohol, nitrocellulose, ethylcellulose, carboxymethyl cellulose ethylhydroxyethyl cellulose, hydroxypropylcellulose, PvOH, polyethylene imine, melamine formaldehyde, urea formaldehyde, terpene resins, alkyd resins, phenolic resins, rosin, ester rosin, linseed oil, silicone resins, unsaturated polyester resins, saturated polyester resins, EVA, starches, polyhydroxyalkanoates, polyamides, polyimides, polyamide imides, PvdC, PvB and compatible mixtures of two or more thereof.

In some cases it may be preferred to use binder materials which are substantially free from ammonia. This may be the case particularly when the scavenging component comprises a component the functionality of which with regard to VOC removal may be compromised by the presence of ammonia.

The film or the film coating may comprise one or more functional materials for other purposes in relation to the functional or aesthetic characteristics of the film. Suitable functional materials may be selected from one or more of the following, mixtures thereof and/or combinations thereof: UV absorbers, dyes; pigments, colorants, metallised and/or pseudo-metallised coatings; lubricants, anti-static agents (cationic, anionic and/or non-ionic, e.g. poly-(oxyethylene) sorbitan monooleate), anti-oxidants (e.g. phosphorous acid, tris(2,4-di-tert-butyl phenyl) ester), surface-active agents, stiffening aids, slip aids (for example hot slips aids or cold slip aids which improve the ability of a film to slide satisfactorily across surfaces at about room temperature, e.g. micro-crystalline wax; gloss improvers, prodegradants, barrier coatings to alter the gas and/or moisture permeability properties of the film (such as polyvinylidene halides, e.g. PVdC); anti-blocking aids (for example microcrystalline wax, e.g. with an average particle size from about 0.1 to about 0.6 μm); tack reducing additives (e.g. fumed silica, silica, silicone gum); particulate materials (e.g. talc); plasticisers; additives to increase COF (e.g. silicon carbide); additives to remove malodorous materials from the surrounding environment; additives to improve ink adhesion and/or printability, additives to increase stiffness (e.g. hydrocarbon resin); additives to increase shrinkage (e.g. hard resin).

The dry weight ratio of the component able to remove volatile organic compounds from the environment to the binder component of the coating may be between 200:1 and 1:200, preferably between 100:1 and 1:100, or from between 50:1 and 1:50, or from between 30:1 and 1:30 These ratios were found to provide an even distribution of the component able to remove volatile organic compounds on the film, as well as reducing dusting and increasing adhesion to the substrate. However, higher ratios of the component able to remove volatile organic compounds from the environment to the coating component or binder increase the exposure of the component to the atmosphere, thereby increasing the rate of removal of the volatile organic component. Also, the preferred ratio depends upon the nature of the selected binder, and for certain binder materials it may be preferable to increase (or decrease) the amount of binder used with respect to the amount of particulate scavenger.

According to a second aspect of the present invention, there is provided a packaging structure including the film discussed above.

The film may form a cover layer or a base layer of the packaging structure. The film may also be able to at least partially surround or envelop an item to be packaged in the packaging structure. Additionally or alternatively, the film may be at least partially laminated to a bubble wrap layer or a moisture absorbent pad. This can act to protect the contents of the packaging structure from damage. The film may also form part of a transit liner or a bag, or may be laminated to another substrate such as a thermoformable film, sheet or tray.

According to a third aspect of the present invention, there is provided a package comprising an item capable of emitting a volatile organic compound at least partially enveloped or surrounded by the packaging structure discussed above. The item may be a comestible or horticultural item.

According to a third aspect of the present invention, there is provided a package comprising an item capable of emitting a volatile organic compound at least partially enveloped or surrounded by the packaging structure discussed above. The item may be a comestible or horticultural item.

Figure 2A:
FIG. 2a illustrates a light microscope image of sample 001 of Example 3.
Figure 2B:
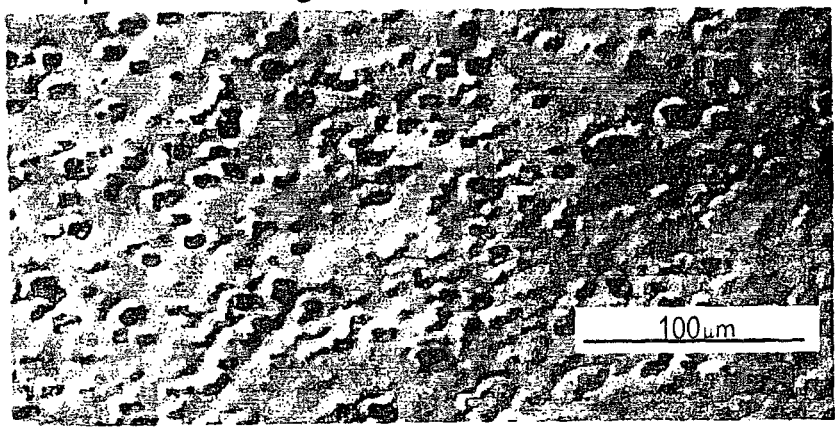
FIG. 2b illustrates a light microscope image of sample 002 of Example 3.
Figure 3:
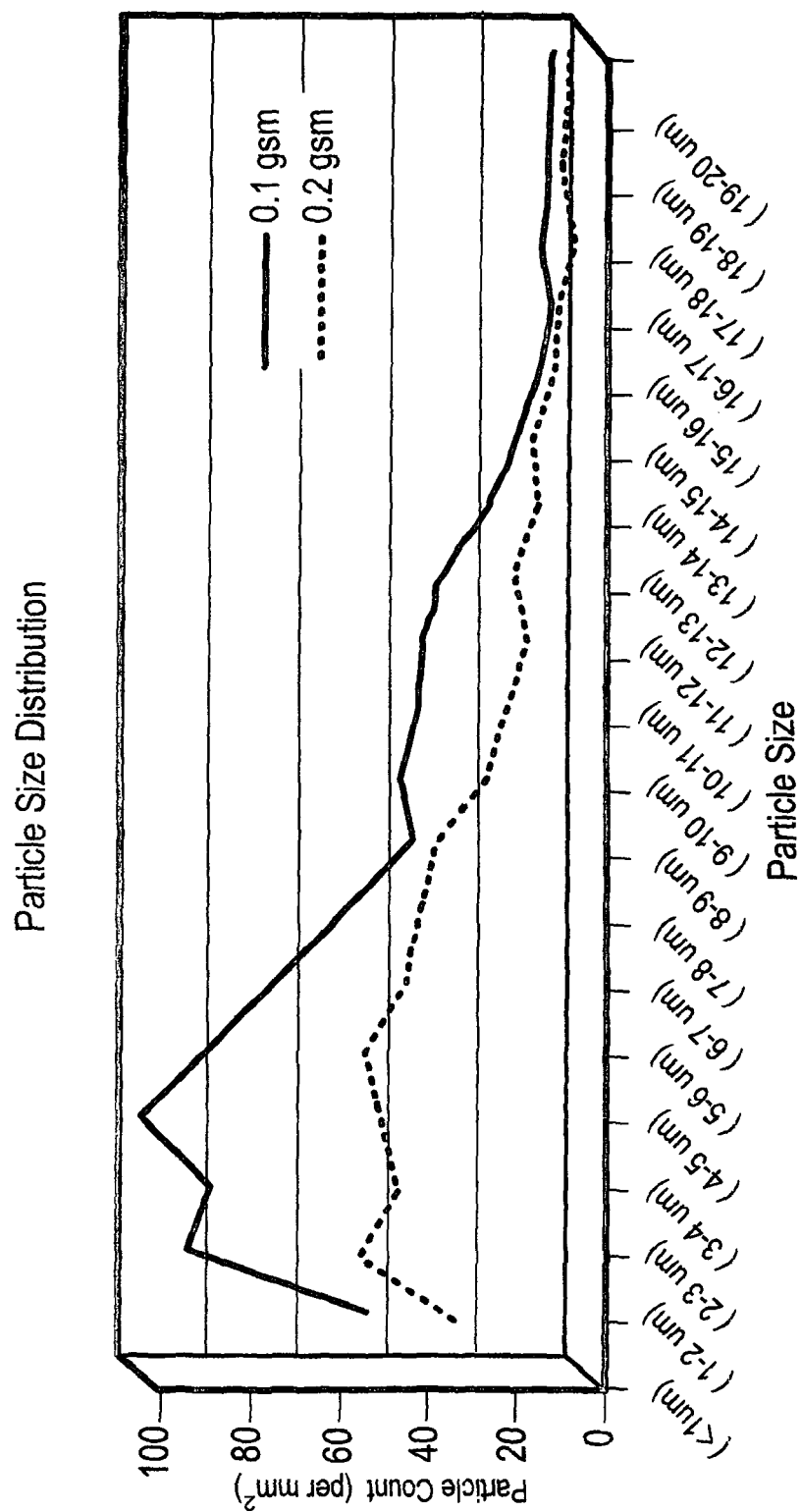
FIG. 3 illustrates a graph of the particle size distribution of the ethylene particles of Example 3.
Figure 4:
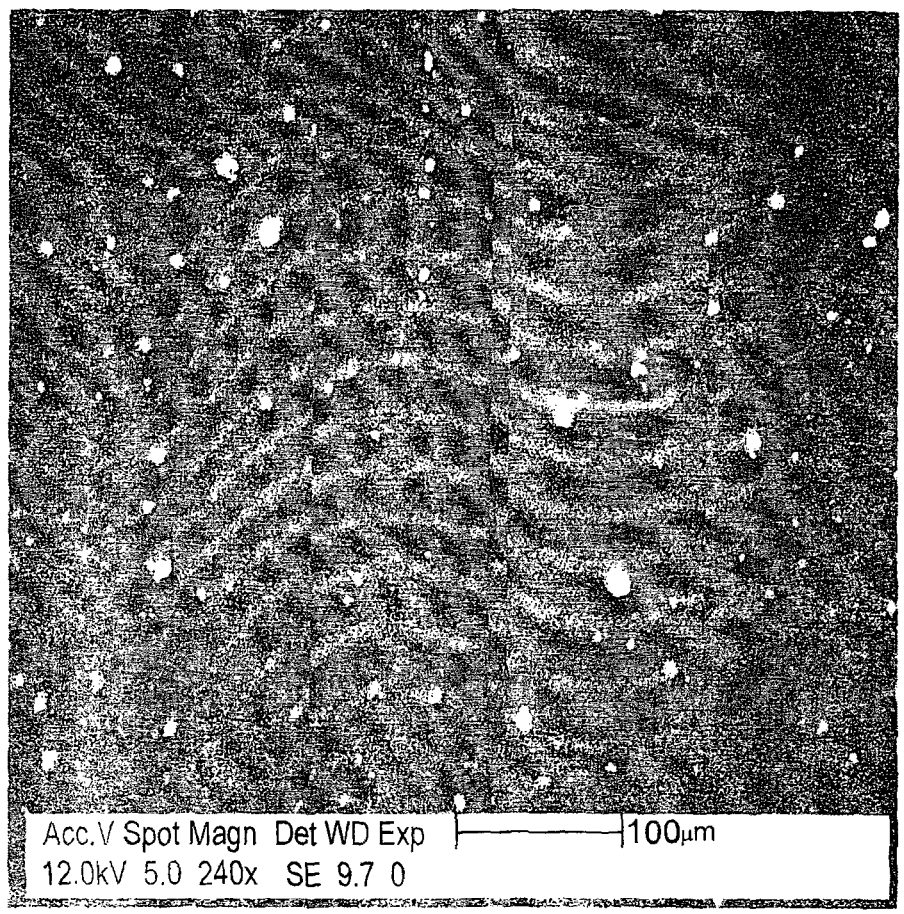
FIG. 4 illustrates a scanning electron microscope image of the surface of sample 001 of Example 3.
Figure 5:
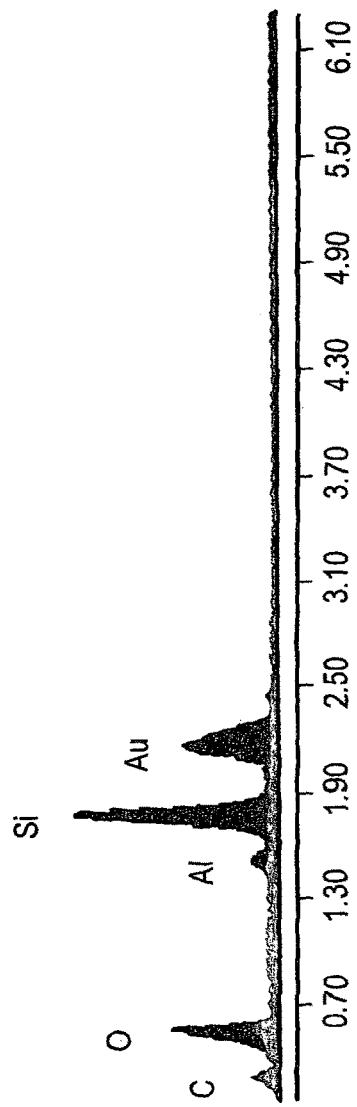
FIG. 5 illustrates an EDX spectrum taken within the zeolite particle.
Figure 6:
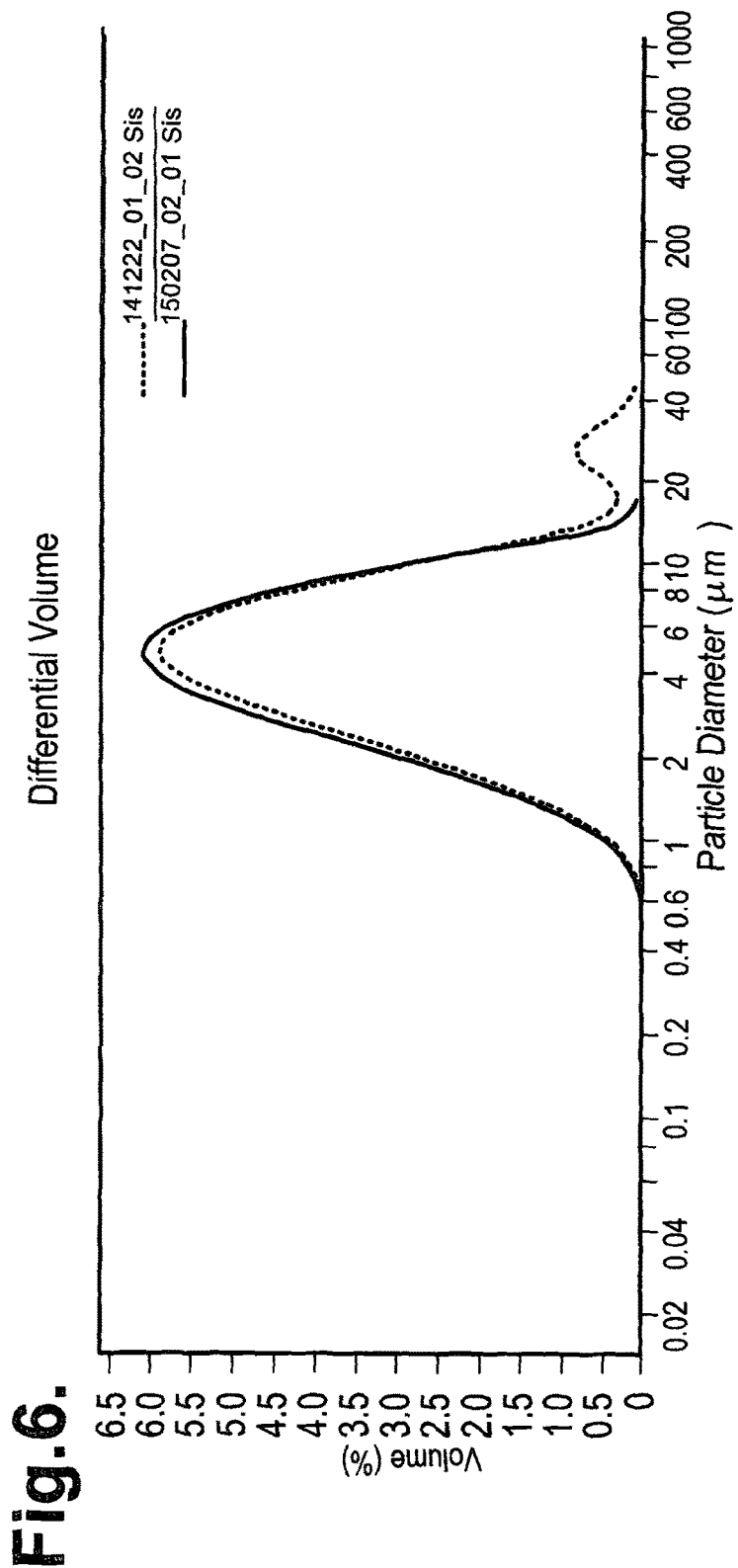
FIG. 6 illustrates with reference to Example 4 below particle size analysis prior to (141222_01_02) and after 3 minutes sonication (150217_02_01), showing a typical particle size distribution of the particular scavenger for use in accordance with the invention as described in Example 4.
Figure 7:
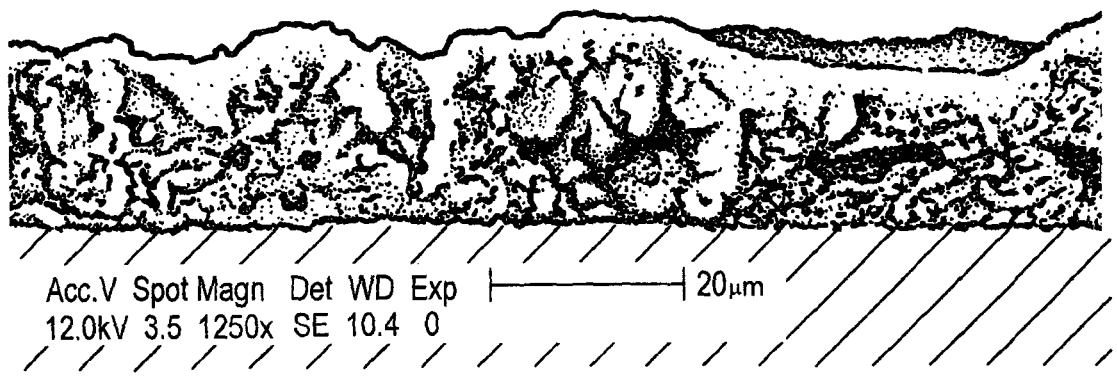
FIG. 7 illustrates an SEM image of a cross section of the coated material of Example 5 (without an overcoat)
Figure 8:
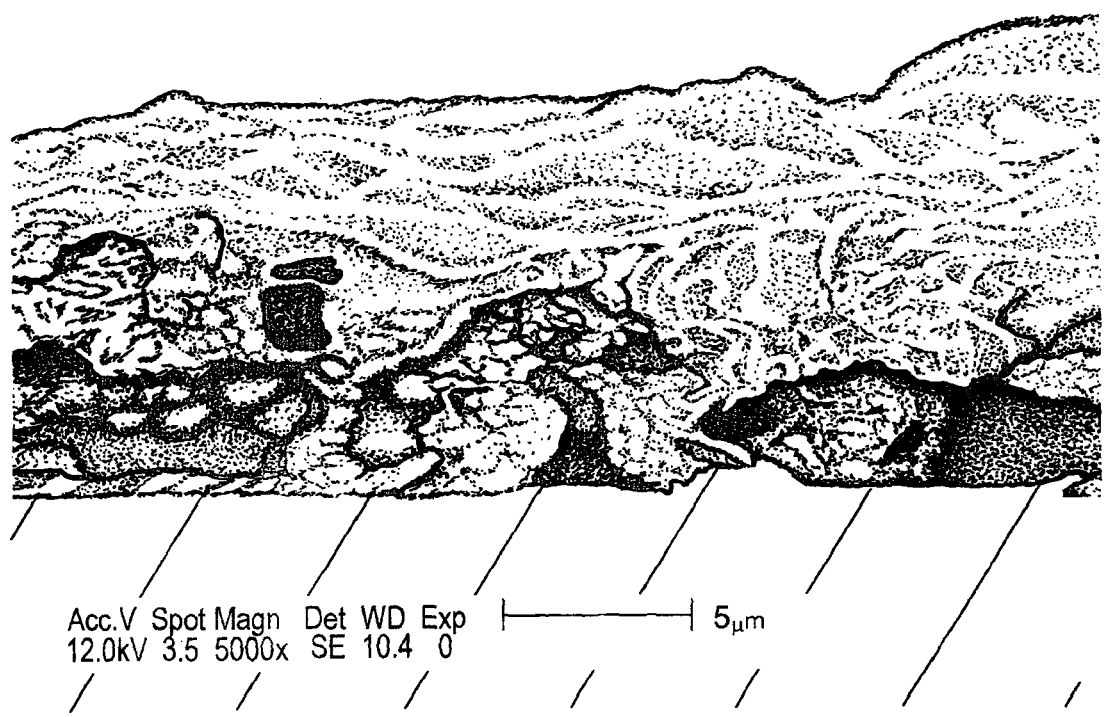
FIG. 8 illustrates an SEM image of a cross section of the coated material of Example 6 (with an overcoat).

One or more embodiments in accordance with the invention will now be more particularly described by way of example only with reference to the following Examples and Figures in which:

FIG. 1 illustrates a scanning electron microscope image of a sectioned edge of sample 002 of Example 3;

FIG. 2a illustrates a light microscope image of sample 001 of Example 3;

FIG. 2b illustrates a light microscope image of sample 002 of Example 3;

FIG. 3 illustrates a graph of the particle size distribution of the ethylene particles of Example 3;

FIG. 4 illustrates a scanning electron microscope image of the surface of sample 001 of Example 3;

FIG. 5 illustrates an EDX spectrum taken within the zeolite particle;

FIG. 6 illustrates with reference to Example 4 below particle size analysis prior to (141222_01_02) and after 3 minutes sonication (150217_02_01), showing a typical particle size distribution of the particular scavenger for use in accordance with the invention as described in Example 4;

FIG. 7 illustrates an SEM image of a cross section of the coated material of Example 5 (without an overcoat); and FIG. 8 illustrates an SEM image of a cross section of the coated material of Example 6 (with an overcoat).

One or more embodiments in accordance with the invention will now be more particularly described by way of example only with reference to the following Examples:

Example 1

BOPP film was primed and then dried. Separately, to avoid IPA (isopropyl alcohol), coming into contact with palladium doped zeolite (scavenger), a water-based slurry of water and scavenger was made. Stirring was maintained so that the slurry did not settle out. An acrylic copolymer (WB1240) was used as a binder in a ratio of 1:9 scavenger:binder, drawn down using a k-bar, and dried in an oven at 90° C. or higher for a set time. The total (dry) coat weight of sample was 0.18-0.2 g/m² of scavenger powder, which was assessed by calculating the total weight of coating divided by the ratio.

The influence of scavenger:binder ratio was assessed by making up different ratios by maintaining a dry weight (of 0.8 g/m²) of scavenger on the surface, but altering the amount of binder (and consequently the coat weight of the binder). It was found that scavenger to binder ratios of less than 1:1 were necessary with this particular binder to achieve films with acceptable appearance, as well as the necessary VOC scavenging capacity.

Example 2

BOPP film was primed and then dried. Separately, to avoid IPA (isopropyl alcohol) coming into contact with palladium doped zeolite (scavenger), a water-based slurry of water and scavenger was made. Stirring was maintained so that the slurry did not settle out. AQ2093 (an ethylene acrylic acid copolymer) was used as a binder in a ratio of 9:1 binder:scavenger, drawn down using a k-bar, and dried in an oven at 90° C. or higher for a set time. The total (dry) coat weight of sample was 0.18-0.2 g/m² of scavenger powder, which was assessed by calculating the total weight of coating divided by the ratio.

The influence of scavenger:binder ratio was assessed by making up different ratios by maintaining a dry weight (of 0.8 g/m²) of scavenger on the surface, but altering the amount of binder (and consequently the coat weight of the binder). It was found that 1:1 ratios gave a streaky coating, with incomplete spreading, and the scavenger "dusted" when scraped with a coin. Lower scavenger:binder ratios all gave a streak-free uniform coating.

Methodology for Ethylene Uptake

A 10×10 cm sample was taken, folded and sealed into a 20 ml glass headspace vial and crimp sealed with a butyl rubber septum. The sample was analysed in triplicate. 3000 μl of Ethylene (100%) was injected into the sealed vial containing the sample. Corresponding empty samples were similarly prepared for use as calibration standards. The prepared samples were left to stand at ambient lab conditions for 7 days prior to GC-FID analysis.

The 1:2 ratio of scavenger:binder was formulated with 27% solids giving a total scavenger content on the surface of 0.8 gsm. 50 μm BOPP was primed using a polyethylene imine primer and the coating was then applied to this giving a total wet thickness of 12 μm. these samples were submitted for ethylene adsorption testing with replicate results shown below.

| Replicate | Ethylene Uptake (μl/100 cm²) |
|---|---|
| 1 | 174 |
| 2 | 280 |

The pores of the zeolite scavenger are formed using an ammonium template and therefore the scavenger may be sensitive to $NH_3$. The binder used in this Example is $NH_3$ stabilised and therefore may hinder ethylene uptake.

Example 3

Two films in accordance with Example 2, one with a coating incorporating 0.1 g/m² scavenger (scavenger:binder ratio of 1:18) (sample 001) and the other with a coating incorporating 0.2 g/m² scavenger (scavenger:binder ratio of 1:9) (sample 002) were created. Areas were cut from both samples and placed on carbon tabs on glass slides for imaging using the zeiss axio $M_2m$ imager compound light microscope using differential interference contrast (DIC).

Reflected light images were also taken and digitally enhanced in order to maximise scavenger particle contrast. Surface particulate was counted using NIS elements software. The raw data was then exported into Excel for further processing and adjusted in order to produce a representative particle count per mm² and graphical representations of surface particle size distribution.

An area was also taken from sample 001 placed on a carbon tab and gold coated for imaging in the scanning electron microscope (SEM). Energy dispersive X-ray analysis (EDX) was also carried out on the particles.

A further area, this time from sample 002, was taken and sectioned. A normal disposable blade was first used and then a diamond knife used to improve the section. The section was then placed in the SEM sample holder and the sectioned edge carbon coated. Areas where a scavenger particle had been sectioned were imaged and EDX analysis carried out again to determine whether palladium could be detected.

FIGS. 2a and 2b clearly show the particles incorporated in the coating in samples 001 and 002 on the film surface. A particle size distribution is shown in FIG. 3. There is a wide distribution of particles and it must be remembered that coating coverage, clearly shown in FIG. 1, will increase the measured particle size.

The palladium ethylene scavenger in this example is on a zeolite carrier. Zeolites are microporous, aluminosilicate minerals commonly used as commercial adsorbents. The zeolite particles can be clearly seen in FIG. 1. The EDX analysis identifies the presence of aluminium, silicon and oxygen, as shown in FIG. 5. The palladium is only present at a low level and was not detected. FIGS. 1 and 2b suggest that at least some of the particles, although well embedded in the coating, have broken through onto the surface. It is possible though that a very thin layer transparent to the electron beam could still give very thin coverage.

The ethylene scavenger particles can be clearly seen on the film surface. They are firmly embedded into the coating and appear to have broken through the coating layer. However, as there is a wide distribution of particle sizes, it is likely that the smaller particles are covered by a very thin layer of coating. EDX analysis clearly identified the presence of silicon, aluminium and oxygen, and the presence of palladium was also determined by XRF.

Example 4

A water based dispersion containing a palladium doped zeolite (scavenger) was made using sonication to facilitate the removal of agglomerates. Agglomerates with particle size 20-40 μm were removed as shown in FIG. 6. The resulting mean particle size (after sonication) was 4.6 μm.

A polyurethane dispersion, was used as the binder system, with scavenger added forming a coating solution having 27% solids content. This was drawn down onto corona treated (38 mN/m dyne) 50 μm BOPP (Innovia Films Ltd) giving a wet thickness of 12 μm. The total dry coat weight on the film surface was 2.0 gsm with a total scavenger content of 0.8 gsm. 100% Adhesion of the coating to the filmic substrate was determined by tape pull-off following drying (i.e. 0% coating removal). Ethylene uptake for replicate formulations has been determined, with results shown below.

| Replicate | Ethylene Uptake ($\mu$l/100 cm$^2$) |
|---|---|
| 1 | 996 |
| 2 | 876 |

Example 5

A water based dispersion containing a palladium doped zeolite (scavenger) was made using sonication to facilitate the removal of agglomerates. Agglomerates with particle sizes of 20-40 $\mu$m were removed with a resulting mean particle size of 4.6 $\mu$m. A polyurethane dispersion was used as the binder system to form a coating with a solids content of 36.6%. This was coated onto corona treated (38 mN/m dyne) 50 $\mu$m BOPP (Innovia Films Ltd) at a speed of 100 m/min, giving a wet coatweight of 20 gsm.

The dry coatweight was 8.5 gsm, determined through coating wash-off, with a total scavenger content of 5.8 gsm. This material showed 95% coat adhesion to the substrate through tape test. Wear testing using a SDL Atlas Crock Meter with a 50 mm×50 mm cloth on a sample size of 3.5×13.5 cm with 100% coating removal in the test area. A second wear test using the Gelbo Flex Tester showed less coating removal than the Crock meter. An A4 sample was mounted onto the machine and flexed 200 times resulting in slight, but visible cracking of the coating.

FIG. 7 shows an SEM image of a cross section of this material. Ethylene uptake of the film was measured in duplicate and the results are shown below:

| Replicate | Ethylene uptake ($\mu$l/12.5 cm$^2$) |
|---|---|
| 1 | 1261 |
| 2 | 1128 |

Example 6

The film described in Example 5 was overcoated with a polyurethane dispersion at 20% solids, giving a coatweight of 1.8 gsm and a total coatweight of sample (primed, coated and overcoated) of 10.4 gsm. 100% adhesion of the coating to the substrate was shown through tape pull-off after drying. In addition, zero coating removal was observed following wear testing using a SDL Atlas Crock Meter (20 cycles) and limited coating removal was observed using Gelbo Flex Tester (200 cycles). There was less coating removal under flexing compared to material that wasn't overcoated.

FIG. 8 shows an SEM image of a cross section of this material. Ethylene uptake of the film was measured in duplicate and the results are shown below, and demonstrate that the overcoat does not affect the efficacy of the active coating.

| Replicate | Ethylene Uptake ($\mu$l/12.5 cm$^2$) |
|---|---|
| 1 | 1505 |
| 2 | 1170 |

The invention claimed is:

1. A film for use in or as a packaging structure, comprising:
   a non-uniform coating comprised of coating material containing a binder and one or more particles forming a protuberant component, wherein one or more of the one or more particles are covered by the binder,
   wherein the protuberant component functions as a scavenging component capable of removing a volatile organic compound from an environment in contact with a surface of the film in the packaging structure,
   wherein the protuberant component extends in a longitudinal plane beyond one or more portions of the non-uniform coating comprising the binder but not the protuberant component,
   wherein the one or more portions of the non-uniform coating comprising the binder but not the one or more particles are defined by a binder thickness corresponding to portions of the coating that do not contain the one or more particles.

2. The film according to claim 1, wherein the binder thickness is from 0.1 $\mu$m to 10 $\mu$m.

3. The film according to claim 1, wherein the binder thickness is selected with reference to the size of the one or more particles in the protuberant component.

4. The film according to claim 1, wherein the binder thickness is less than the size of any of the one or more particles.

5. The film according to claim 1, wherein the binder thickness is from about 10% to about 90%, from about 20% to about 80% or from about 25% to about 75% of the size of the protuberant component.

6. The film according to claim 1, wherein the coating comprises a flood coating providing an even distribution of coating applied to the film, including an even distribution of the protuberant component thereto.

7. The film according to claim 1, wherein the coating comprises an acrylic polymer and/or a wax.

8. The film according to claim 1, wherein the film further comprises a functional barrier layer as a topcoat that is applied in a separate coating step.

9. The film according to claim 8, wherein the barrier layer comprises a component that migrates to a surface of the barrier layer to form a barrier.

10. The film according to claim 1, wherein the volatile organic compound is ethylene, acetaldehyde or a plant growth regulator.

11. The film according to claim 10, wherein the scavenging component able to remove ethylene from the environment in contact with the film in the packaging structure comprises a sorbent.

12. The film according to claim 11, wherein the sorbent comprises a microporous material.

13. The film according to claim 12, wherein the microporous material comprises a zeolite or a clay.

14. The film according to claim 12, wherein the microporous material comprises:
   a doped microporous material;
   a metal doped microporous material; and/or
   a palladium doped microporous material.

15. The film according to claim 1, wherein the concentration of the scavenging component is between 0.001 and 50 gm$^{-2}$.

16. The film according to claim 1, wherein the dry weight ratio of the scavenging component to the binder is between 200:1 and 1:200.

17. A packaging structure comprising the film of claim 1.

18. The packaging structure of claim 17, wherein the film forms a cover layer and/or a base layer of the packaging structure.

19. The packaging structure of claim 17, wherein the film is at least partially laminated to a bubble wrap layer or a moisture absorbent pad or a further substrate.

20. A package comprising an item capable of emitting a volatile organic compound at least partially enveloped or surrounded by the packaging structure of claim 17.

21. The package according to claim 20 wherein the item is a comestible or horticultural item.

* * * * *